J. ERRET.
ADJUSTABLE FOLDING SEAT.
APPLICATION FILED JUNE 10, 1916.
1,220,832. Patented Mar. 27, 1917.
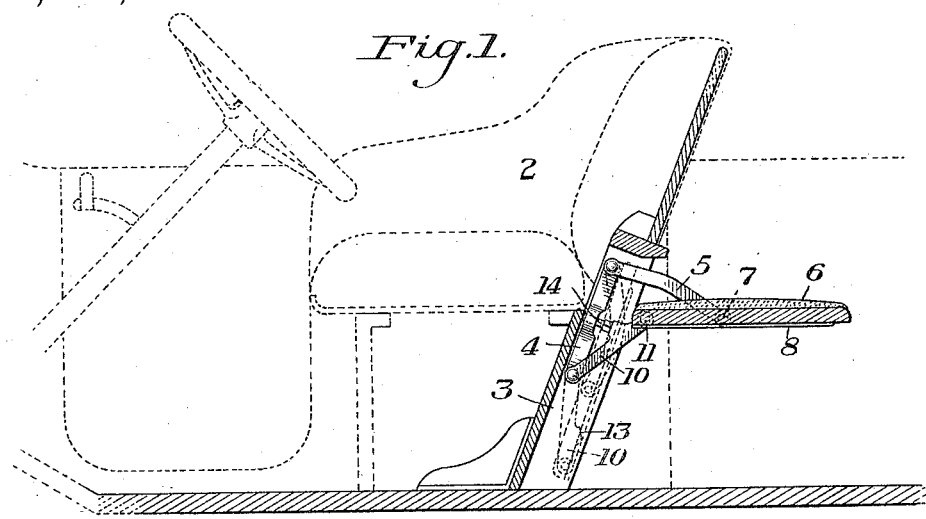
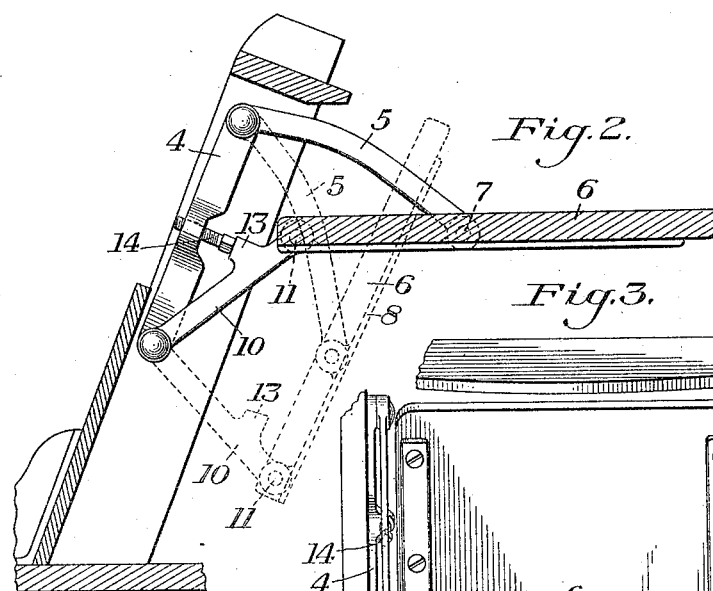
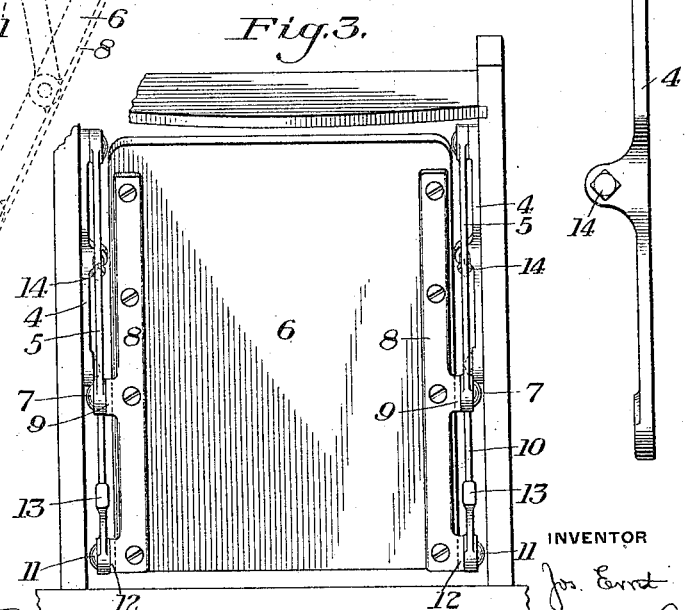
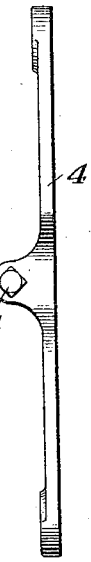

UNITED STATES PATENT OFFICE.

JOSEPH ERRET, OF CLEVELAND, OHIO.

ADJUSTABLE FOLDING SEAT.

1,220,832.      Specification of Letters Patent.      Patented Mar. 27, 1917.

Application filed June 10, 1916. Serial No. 102,866.

*To all whom it may concern:*

Be it known that I, JOSEPH ERRET, a citizen of the United States, residing at Cleveland, in the county of Cuyahoga and State of Ohio, have invented a new and useful Improvement in Adjustable Folding Seats, of which the following is a full, clear, and exact description, reference being had to the accompanying drawings, forming part of this specification, in which—

Figure 1 is a sectional elevation of a portion of an automobile having my invention applied thereto, some of the automobile parts being shown in dotted lines.

Fig. 2 is a detail sectional view showing the seat.

Fig. 3 is a rear elevation, partly broken away, of the seat in folded position, and Fig. 4 is an edge view of one of the bearing plates or straps.

My invention has relation to adjustable folding seats, and is particularly designed to provide a seat of this character for use in connection with the fixed seats of automobiles.

My invention provides a folding seat which can be readily applied to automobiles; which can be readily adjusted to different angles, both in initially applying the seat or in its use; which will retain itself in its folded position without auxiliary fastening means; and which is of simple and strong construction.

Referring to the accompanying drawings, the numeral 2 designates the front seat of an automobile, the back of which is formed with a suitable pocket or recess 3, open at the rear, for the reception of the folded seat in its folded position. Fixedly secured to the back frame of the seat 2 at the side walls of this pocket or recess are two plates or straps 4. Pivoted to the upper portion of each of these plates or straps is a curved link 5 which at its other end is pivotally connected to one side of the seat 6 at the point 7 which is preferably somewhat below the center line of the seat when in folded position. To provide for the pivotal movement, the frame of the seat may be provided with the plates or straps 8 secured thereto and having the lugs 9 for these pivot connections. Pivoted to the lower end portion of each of the plates or straps 4 in a shorter link 10 whose other end is pivoted at 11 to the inner or lower end of the seat. These pivotal connections may also be provided by lugs 12 on the plates or straps 8. Each of the links 10 is formed with a projecting stop lug 13 which, when the seat is in its extended position ready for use, is adapted to abut an adjustable stop 14. One of these stops 14 is carried by each of the plates or straps 4 and may be conveniently formed by a screw bolt.

When in folded position the seat lies backward in the pocket or recess in the back of the seat 2. In this position it is retained in place by its own gravity, since any outward movement of the seat from this position must necessarily be by an upward movement of the same. Therefore no holding devices are required to retain the seat in this position. When it is desired to use the seat, its upper edge may be grasped by the hand and it is then pulled outwardly and rearwardly until it reaches the position shown in dotted lines in Fig. 2. Further movement thereof swings the seat into the substantially horizontal position shown in full lines in Figs. 1 and 2, at which time the stops 13 come in contact with the adjustable stops 14. The weight of the seat and of the occupant thereon is taken as a direct thrust against these adjustable stops.

While I have shown the folding seat as applied to an automobile seat having an inclined back, it can be equally well applied to a seat having a vertical back. The adjustable stops 14 not only permit of the seat 6 being placed at any desired angle when in position for use; but are also of great advantage in applying the seat. If there is any variation in the mounting of the bearing plates, or in the angle of the back of the automobile seat, the proper adjustment can nevertheless be readily obtained by an adjustment of these stops. For instance, if one of the bearing plates 4 should be set in a little different position from the other one, a proper adjustment of one of the stops will overcome this variation. The entire construction is a simple and serviceable one.

I do not desire to limit myself to the details of construction and arrangement which I have herein shown and described, as it will be obvious that numerous changes may be made without departing from the spirit and scope of my invention as defined in the appended claims.

I claim:

1. An adjustable seat of the character described, comprising a seat proper, a fixed support, and two pairs of links pivoted to said support and to the seat, the links of one pair having stop portions, and the support having coöperating adjustable stops or abutments therefor, substantially as described.

2. The combination with a support, of a seat member, a pair of links pivoted to said support and to the lateral edges of the seat member at a point intermediate its outer and inner edges, a second pair of links pivoted at one end of the support at a lower level than the pivotal connections of the first named links and at their other ends to the inner or rear portion of the seat member, the last named links having stop portions, and the support having adjustable abutments for engagement with said stop portions, substantially as described.

3. The combination with a support having a pocket or recess therein, a seat member adapted to lie within said pocket or recess when in folded position, a pair of links pivotally connected to the side walls of said pocket or recess at the upper portion thereof and pivotally connected at their outer ends to the lateral edge portions of the seat member at points somewhat below the center thereof, and another pair of links pivotally connected at their lower ends to the side walls of the pocket or recess and at their upper ends to the lateral edges of the seat member at points near the inner edge of said member, and adjustable stop means for supporting the seat member in its extended position, substantially as described.

4. The combination with a support having a pocket or recess therein, and a seat member adapted to be contained within said pocket or recess when in folded position, of an upper pair of links pivoted at their upper ends at the upper side portions of said pocket or recess and at their lower ends to the lateral edges of the seat member at points distant from the inner edge of said member, a lower pair of links pivoted at their inner ends to the walls of said pocket or recess at a lower level than the upper links and having their outer ends pivotally connected to the rear portion of the seat member, said seat member being adapted to swing from its folded position upwardly and outwardly on said links, and adjustable stop mechanism for supporting the seat in its extended position, substantially as described.

In testimony whereof, I have hereunto set my hand.

JOSEPH ERRET.

Witnesses:
JOHN McGRATH,
G. R. SMYTHE.

Copies of this patent may be obtained for five cents each, by addressing the "Commissioner of Patents, Washington, D. C."